UNITED STATES PATENT OFFICE.

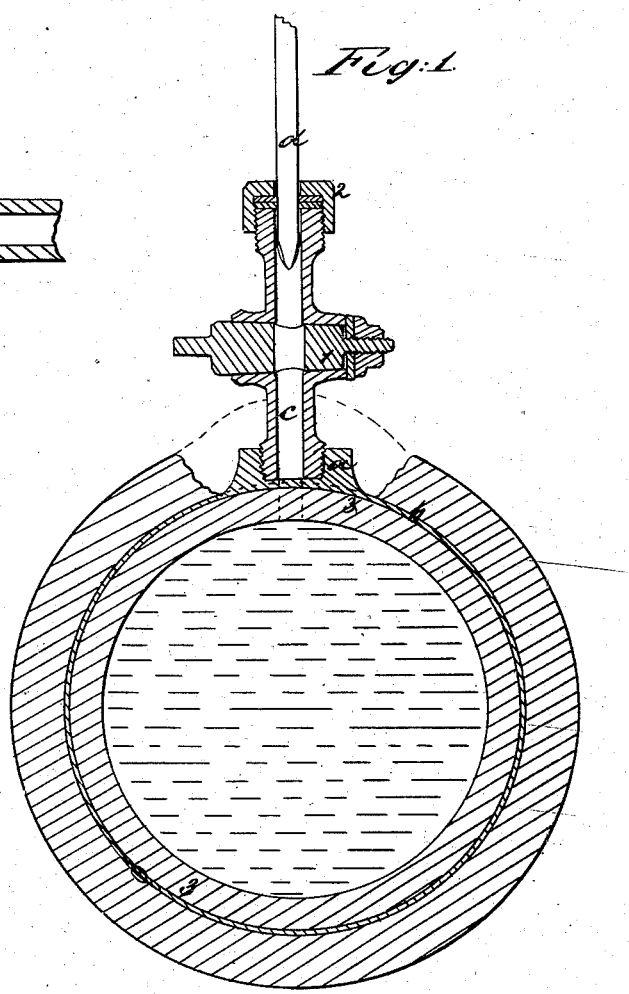

JONATHAN BALL, OF NEW YORK, N. Y.

MODE OF CONNECTING WATER-PIPES.

Specification of Letters Patent No. 11,264, dated July 11, 1854.

*To all whom it may concern:*

Be it known that I, JONATHAN BALL, of the city, county, and State of New York, have invented, made, and applied to use certain new and useful improvements in means for connecting the branch or service pipe to my "indestructible water-pipe," for which pipe Letters Patent of the United States were issued on December 15, 1843; and I do hereby declare that the following is a full, clear, and exact description of the construction and operation of the same, reference being had to the annexed drawing, making part of this specification, wherein—

Figure 1, is a section of the pipe and cock attached; Fig. 2, is an elevation of the boring tool, and Fig. 3, is a section of the screw coupling.

The like marks of reference denote the same parts.

The nature of my said improvements consists in casting a boss of soft metal onto the metallic tube set forth in the before mentioned patent, so as to connect a cock to said tube, through which cock a suitable tool is entered and the metal tube and cement lining bored through so as to pass the water.

The water pipe being constructed as set forth in the before mentioned patent need not be farther described; and where an exterior covering of cement is used the same is to be removed by a suitable chisel, until the iron tube is reached, which iron is to be cleaned and tinned. The interior coating of cement being a nonconductor allows the tinning to be performed, even with the pipe full of water. The workman then takes a mold of wood or metal, the under side of which is concave so as to fit tightly to the metal pipe or tube $b$; this mold has a hole of the necessary diameter and shape, (being enlarged on the under or concave side next to the pipe) to form the boss required. The metal, either solder or lead, is then melted into the mold, and by the use of a heated soldering iron inserted into the mold on the top, the metal is heated and thoroughly attached to the pipe, previously tinned. The boss $a$, so formed on the pipe may then be perforated by boring down to the iron pipe, the hole bored being the exact size required for inserting and screwing in the stop cock $c$, which is provided with a thread for that purpose, or the hole for the stop cock may be made through the boss by the insertion of a wood or metallic plug of the proper size while the metal is fluid, before removing the mold, the solder or lead cools around this plug, which when withdrawn leaves the hole required for the screw of the stop cock ($c$) as before; or the stop sock $c$, may be soldered onto the pipe in the usual way by plumbers, without the use of the mold and is then ready to be bored through as next specified, the object being to enable me to insert the stops for service pipe without shutting off the water or encountering it in the operation.

The cock $c$, is so constructed that the plug 1, thereof will pass a boring tool $d$, which is entered through the cock and around this tool a leather or other elastic packing is placed, and the screw coupling 2, screwed on, which allows the tool to be rotated till the tube $b$, and the cement lining 3, are bored through, and the packing now prevents the escape of water. The bit or tool which is round and of the same size throughout its length is now to be withdrawn above the water way of the plug of the cock, which cock is then shut and the coupling 2, and tool $d$ removed. The cock is now ready to have a lead or other pipe attached by means of the coupling pipe 4, and screw socket 2, see Fig. 3.

When desired the boss and lower part of the cock can be covered with cement, as indicated by dotted lines in Fig. 1.

I am aware that water pipes have been tapped in a variety of ways, the most usual being to drive a short pipe, formed at right angles to a cock, into a hole bored in the metal pipe, but this can not be done with my patent indestructible water pipe, therefore I have resorted to the above described means. And I do not claim soldering or screwing a cock onto a pipe as this is often done with lead or other pipes, but What I desire to secure by Letters Patent is—

I claim the cock $c$, attached to the metal tube $b$, in combination with the boring tool $d$, inserted through the cock, by which the pipe and cement is perforated in the manner and as specified.

In witness whereof I have hereunto set my signature this fifth day of May one thousand eight hundred and fifty four.

JONATHAN BALL.

Witnesses:
WM. F. SERRELL,
LEMUEL W. SERRELL.